(12) United States Patent
Rhodus et al.

(10) Patent No.: US 8,908,210 B2
(45) Date of Patent: Dec. 9, 2014

(54) PROCESS ENABLEMENT IN NETWORK DOWNTIME CONDITION

(71) Applicant: Lexmark International, Inc., Lexington, KY (US)

(72) Inventors: Samuel Leo Rhodus, Lexington, KY (US); Forrest Steely, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 13/731,644

(22) Filed: Dec. 31, 2012

(65) Prior Publication Data

US 2014/0185085 A1    Jul. 3, 2014

(51) Int. Cl.

| | |
|---|---|
| *G06F 3/12* | (2006.01) |
| *G06K 15/00* | (2006.01) |
| *H04N 1/32* | (2006.01) |
| *H04N 1/00* | (2006.01) |

(52) U.S. Cl.
CPC .......... *H04N 1/32641* (2013.01); *G06F 3/1293* (2013.01); *H04N 1/00278* (2013.01)
USPC .......... 358/1.15; 358/1.1; 358/1.14; 358/1.16

(58) Field of Classification Search
USPC ...................... 358/1.15, 1.18, 1.13, 1.1, 1.16; 370/338, 254, 255, 217, 219, 241, 396, 370/351, 259, 389, 392, 252, 463, 465; 707/770, 758, 781, 645, 674, 680, 684; 709/222, 224, 206, 213, 217, 250, 219
See application file for complete search history.

(56) References Cited

U.S. PATENT DOCUMENTS

| | | | |
|---|---|---|---|
| 2002/0163653 A1* | 11/2002 | Struble et al. .................. 358/1.2 |
| 2010/0082980 A1* | 4/2010 | Shiraki ......................... 713/168 |
| 2011/0075200 A1* | 3/2011 | Goldwater et al. .......... 358/1.15 |
| 2012/0287460 A1* | 11/2012 | McMillin et al. ............ 358/1.15 |

* cited by examiner

*Primary Examiner* — Ngon Nguyen

(57) ABSTRACT

It is a first aspect of the present disclosure to provide a computer implemented method of enabling a peripheral device connected to a network during an inactive communication with the network, that includes activating an ad-hoc network connection with a mobile device during the inactive communication of the peripheral device with the network; transmitting a document to the mobile device for processing; receiving the processed document from the mobile device; storing the processed document in a memory of the peripheral device; and sending the processed document to a remote storage location once the peripheral device is determined to be actively communicating with the network.

20 Claims, 2 Drawing Sheets ured on paper during the network downtime condition.
PROCESS ENABLEMENT IN NETWORK DOWNTIME CONDITION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates generally to a method for enabling processes of a device and, more specifically, enabling processes of a device during a network downtime condition.

2. Description of the Related Art

In many environments that rely on electronic and paper-based processes, there is a reliance on a network infrastructure to effectively and efficiently perform process-oriented work tasks. If the network infrastructure becomes unavailable (i.e., a network downtime condition occurs) through planned or unplanned network outages, the access to critical process elements and steps may also become unavailable. Examples of network-based process elements or steps include, but are not limited to, accessing centrally located documents and forms (such as on a server or in a remote storage location), processing workflow steps (such as scanning documents to an electronic file share) and completing field entries in forms utilizing electronically stored data.

In many cases, once the network becomes unavailable, workers shift from electronic process entry to a more manual process, such as paper-based processing. The manual processing of forms and documents may lead to a higher potential for error and a less efficient processing of documents. Additional labor may also be needed once the network is back up or running in order to process the data that was manually captured on paper during the network downtime condition.

Thus, there is a need for a solution that will enable a device to continue utilizing network-based processes during network downtime (i.e., where communication with a network is unavailable). There is also a need for a solution that will maintain efficient and accurate processing of documents with minimal procedural or process changes when a network infrastructure is unavailable.

SUMMARY

A system and methods of enabling a peripheral device connected to a network during an inactive communication with the network are disclosed herein. One example embodiment of enabling the device may include activating an ad-hoc network connection with a mobile device during the inactive communication of the peripheral device with the network, transmitting a document to the mobile device for processing, receiving the processed document from the mobile device, storing the processed document in a memory of the peripheral device, and sending the processed document to a remote storage location once the peripheral device is determined to be actively communicating with the network.

In one aspect of the example embodiment, the peripheral device may receive a request for the document prior to the sending of the document to the mobile device. In another aspect, the peripheral device may automatically perform the sending the processed document once the peripheral device is determined to be actively communicating with the network.

In another aspect of the example embodiment, an updated copy of the document may be received from the remote storage server by the peripheral device. In another aspect, the processing may include capturing barcode information. In yet another aspect of the example embodiment, storing the processed document may include adding the processed document to a queue of one or more documents stored in the memory. In another aspect, the method may further include sending the one or more documents to the remote storage location once the peripheral device is determined to be actively communicating with the network.

From the foregoing disclosure and the following detailed description of various example embodiments, it will be apparent to those skilled in the art that the present disclosure provides a significant advance in the art of methods for enabling network-based processes in a device during a network downtime condition. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
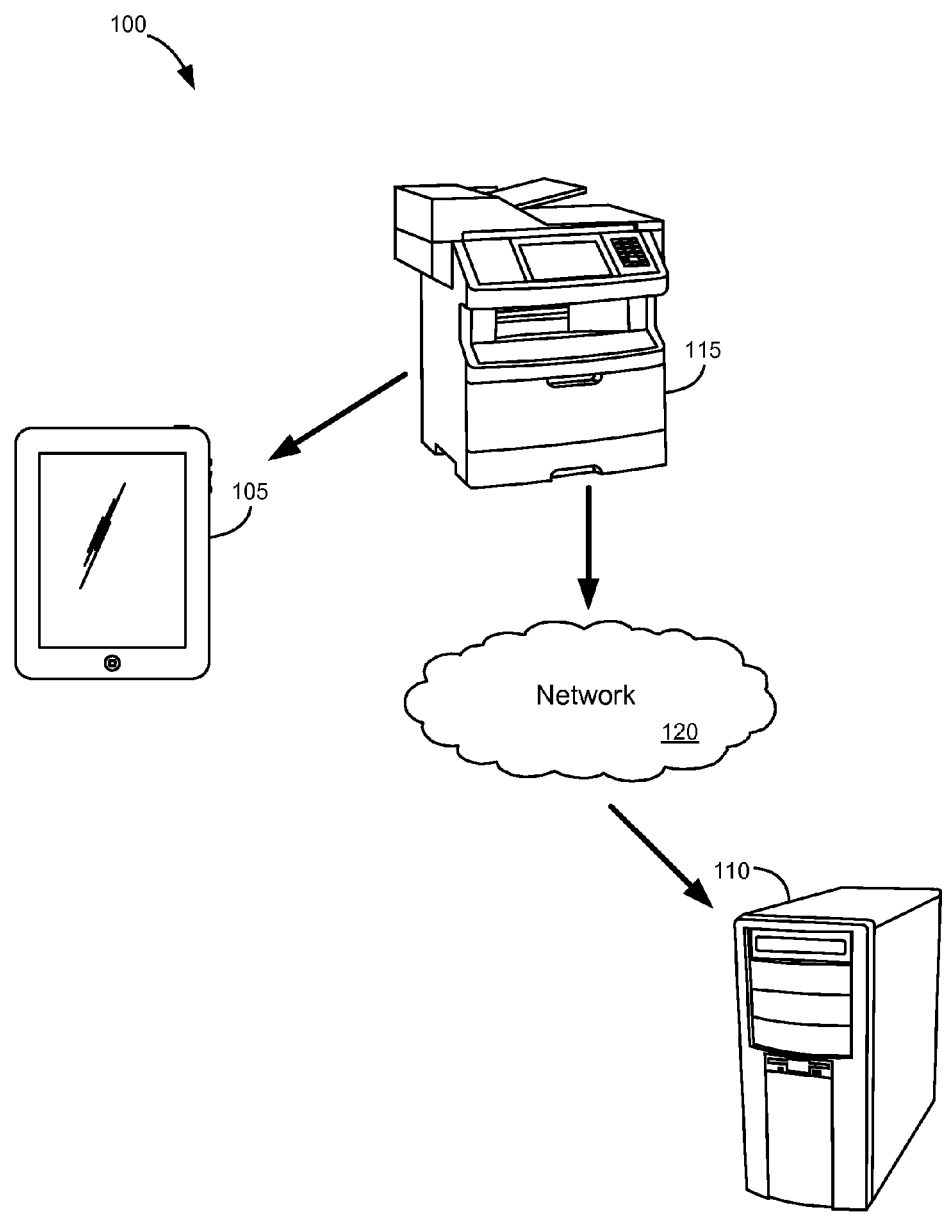
FIG. 1 is one example embodiment of a networked system.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented to solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are a system and methods for enabling network-based processing by a computing device connected to a network during a period of an inactive communication with the network. According to one example embodiment of the present disclosure, when the computing device is detected to be inactively connected to the network such as, for example, during a network downtime, the computing device may activate an ad-hoc network connection with a mobile device. The computing device may then send the document to be processed to the mobile device. In one example embodiment, the mobile device may perform the network-based process on the document such as, for example, inputting or completing information on the document. Upon completion of the network-based processing of the document by the mobile device, the processed document may be sent to the computing device for further processing and/or storing into a queue until the computing device is determined to be in an active communication with the network.

The system and methods described herein may enable workflow solutions to continue with minimal procedural or process changes when the network infrastructure is unavailable either through a planned or unplanned network outage or when the computing device loses its communication with the network. The example embodiments described herein may be achieved by utilizing storage and ad-hoc networking capabilities along with forms server logic on a computing device or appliance.

FIG. 1 is one example embodiment of a networked system 100, according to one example embodiment of the present disclosure. System 100 is a data communication system that may include a client device 105, a remote computer 110 and a multi-function printing device (MFP) 115. Remote computer 110 and MFP 115 may be connected through a network 120.

Client device 105 may be any computing device. In one example embodiment, client device 105 may be, for example, a personal computer. Client device 105 may include a display unit, an input device (e.g., keyboard), a processor, and memory, such as RAM, ROM, and/or NVRAM. Client device 105 may also include a mass data storage device, such as a hard drive, CD-ROM and/or DVD units. During operation, client device 105 may include in its memory a software program including program instructions that function as a document processing application for processing one or more documents received from MFP 115. Client device 105 may include an imaging driver (not shown) that may communicate with MFP 115 via a communications link. In addition, the imaging driver may provide processed documents for storing and/or printing by MFP 115.

In another example embodiment, client device 105 may be any computing device that is portable, handheld or pocket-sized such as, for example, a mobile device (e.g., a cell phone), a smart phone, a handheld computer, a personal digital assistant (PDA), a notebook computer, a tablet computer, or any other remote computing device, such as a special-purpose remote computing device (e.g., e-book reader). Additionally, client device 105 may include at least one control unit such as, for example, a processor (not shown) that controls the operation of the computing device.

MFP 115 may be network-enabled and capable of communicating with remote computer 110. For example, MFP 115 may be connected to remote computer 110 via a communication link, which may be established by a wired or wireless connection such as, for example, an Ethernet connection. MFP 115 may be any device capable of printing or producing a hard copy data file or document stored in electronic form, such as a laser, inkjet or dot matrix printer or a multi-function printing device capable of performing other functions, such a faxing, e-mailing, scanning and/or copying, in addition to printing.

MFP 115 may include a control unit and a print engine. The control unit of MFP 115 may include one or more embedded solutions that may store and provide templates or copies of one or more documents for use by a user of MFP 115. In some example embodiments, the embedded solution may be a software application that may be stored in a non-transitory computer readable storage medium associated with the control unit and may be executed by the control unit in accordance with programmed logic associated with the software application.

In one aspect, MFP 115 may include a processor (not shown) in communication with a user interface (not shown), a memory (not shown), and a scanning subsystem (not shown). The user interface may be a graphical user interface, a monitor, a series of buttons, a touch-sensitive display panel, a text interface such as a 2-line display, and a voice-activated interface or the like. In one aspect, the user interface may serve as an operating panel for MFP 115. It is also within the scope of this aspect to utilize a computer (not shown), such as personal computer, having a monitor as the user interface. Those skilled in the art will appreciate that MFP 115 may include various additional components, such as a facsimile, scanner and/or card reader. MFP 115 may also include one or more appropriate software applications configured to receive print data or one or more files from a print server (not shown) and to output or print pages through a print engine (not shown) of MFP 115.

MFP 115 may be connected to network 120 by a direct cable or optical connection or by a network connection such as, for example, an Ethernet local area network (LAN). The connection between MFP 115 and network 120 may be established by an Internet connection, or via a wide area network (WAN). Communication links between MFP 115 and network 120 may be established by using standard electrical cabling or bus structures. The communication links may also be established using wireless connections. Where the communication links are wireless, MFP 115 may further include a radio transceiver. The wireless connection may be, for example, 2G, 3G, Bluetooth, CDMA, DECT, TDMA, UMTS-TDD, WiBro, WiFi, or WiMAX. Wired connections may be proprietary or constructed in accordance with an communications industry standard, such as USB or FireWire (IEEE-1394).

When used in a LAN networking environment, MFP 115 may be connected to the local area network through a network interface or adapter. When used in a WAN networking environment, MFP 115 may include a modem, T1 line, satellite or other means for establishing communications over a wide area network, such as the Internet. The modem, which may be internal or external, may be connected to a system bus of MFP 115 via a serial port interface.

In a networked environment, program modules, applications or workflow solutions, or portions thereof, performed by MFP 115 may be stored in local or remote memory storage devices. In some example embodiments, MFP 115 may be linked to other processing devices in order to perform certain tasks. It will be appreciated that the network connections described are illustrative and other means of establishing a communications link between the computing devices may be used.

MFP 115 may store in its memory one or more electronic documents that may serve as local copies of forms or templates which a user of MFP 115 may use for data input and/or processing. For example, in the healthcare industry, the forms or templates may include, but are not limited to, patient intake forms, patient records, medical history forms, reporting and billing forms, and other types of documents. The local copies of the forms or templates may be stored in the memory of MFP 115, such that when a user of MFP 115 wishes to print a copy of the form to be filled in with information, the user may simply operate the MFP 115 to retrieve a copy of the form or template from its memory and print a hard copy. Having local copies of the electronic forms allows the form templates to be readily available for use as desired or needed, thus eliminating the need for MFP 115 to connect to a remote storage server every time a user of MFP 115 wishes to use a copy of the one or more form templates available in the memory of MFP 115.

During use, MFP 115 may operate in a networked environment using logical connections to one or more other computing configurations, such as remote computer 110. Remote computer 110 may be a personal computer, a server, a router, a network PC, a peer device or other common network node. As set forth above, the logical connections between MFP 115 and remote computer 110 may include a local area network (LAN) and/or a wide area network (WAN).

In one example embodiment, remote computer 110 may be a central capture or repository service that may be used to store electronic documents containing information gathered using MFP 115. For example, remote computer 110 may be a centralized document management system such as, for example, a Health Information Management System (HIMS).

In one example embodiment, remote computer 110 may provide updated versions of the local copies of the electronic form documents or templates stored in MFP 115. For example, when the local copies of the form templates are updated with a new version, remote computer 110 may provide MFP 115 with the newer versions of the form templates through an update.

Updating the local copies of the form templates in MFP 115 may include automatically delivering updated copies to MFP 115. Automatic delivery of updated copies may be performed by either a pull method or a push method. In the pull method, MFP 115 may periodically poll the remote computer 110 to ensure it has the most recent versions of the forms in its memory. In another example embodiment, a central forms server may store the form templates, and MFP 115 may periodically poll the central forms server for updated copies of form templates.

In the push method, MFP 115 may use subscription services such as, for example, Really Simple Syndication (RSS), in order to be notified when updates are available and/or when an action is required to update the local copies of the form templates. A means to register MFP 115 for syndication services may be utilized to ensure correct and current forms are available on MFP 115. Syndication services for subscribing to updates as described herein is illustrative and should not be considered limiting. Other subscription services as will be known in the art may be used in some alternative example embodiments.

Client device 105 and MFP 115 may connect and communicate wirelessly through short-range, ad hoc networks, which may be established dynamically and automatically as the client device 105 and MFP 115 enter and leave radio proximity to each other.

With continued reference to FIG. 1, network 120 may be any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein. Other types of networks and communications mode may be used to connect client device 105, MFP 115 and remote computer 110 from each other, as will be known in the art.

Although the system in FIG. 1 shows only one client device 105, one MFP 115 and one remote computer 110, networked system 100 may have any number of components and devices, as will be appreciated by one of ordinary skill in the art.

Figure 2:
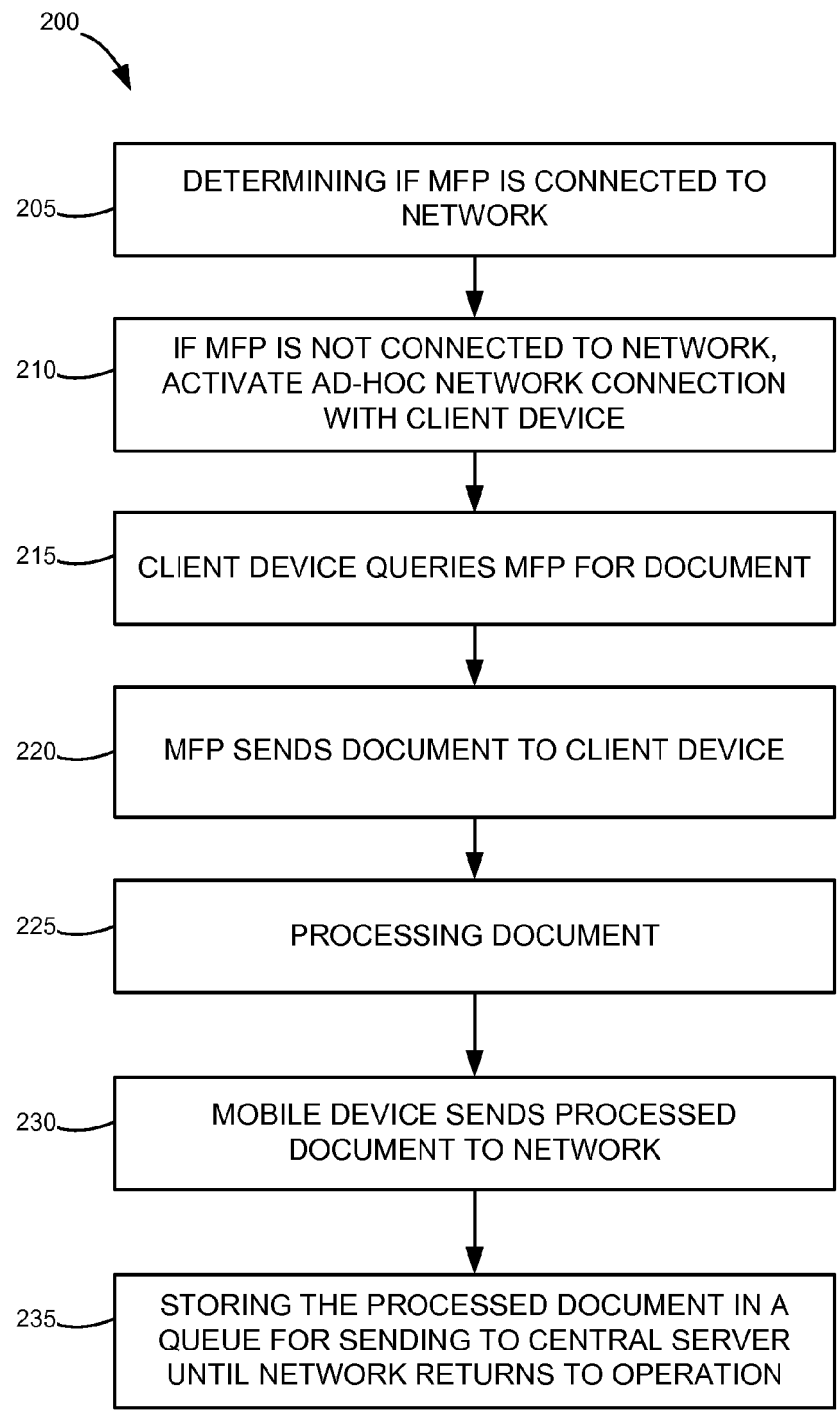
FIG. 2 is a flowchart of one example method for enabling a device of the system of FIG. 1 to perform network-based document processing during a network downtime condition.

FIG. 2 is a flowchart of one example method 200 for enabling a device, such as MFP 115 of networked system 100, to perform network-based document processing during a network downtime condition or communications loss between the device and remote computer 110. Method 200 may enable workflow solutions to continue with minimal procedural or process changes during such outages.

Method 200 may include determining if the device is actively connected to network 120, activating an ad-hoc network connection with a client device, sending a document to the client device, processing the document, and storing the document in a memory of the device for transmission to a remote computer when network 120 is determined to be in an uptime condition or communication is re-established between the device and network 120. Allowing ad-hoc network connections to be established between the device and a client device enables electronic transfer of a downtime document for processing by client device 105. This transfer enables electronic capture of data into the document for a higher efficiency and success rate of processing information. Availability of the electronic downtime form may also minimize the changes in process and procedure regardless of network state.

With reference to FIG. 2, at block 205, it is determined whether MFP 115 is actively connected or communicating with network 120. An active connection with network 120 may refer to a state wherein MFP 115 is able to communicate with a node in network 120 that is connected to MFP 115 such as, for example, remote computer 110.

In one example aspect, determining if MFP 115 is in active connection or communication with network 120 may include determining whether network 120 is in an uptime or downtime condition. A network uptime condition may refer to a period during which network 120 is operational, and MFP 115 is able to communicate with other nodes in network 120. A network downtime condition may refer to a period during which network 120 is determined to not be operational, and communication with other nodes in network 120 is unavailable. A network downtime condition may occur during planned outages such as, for example, during routine maintenance. Network downtime condition may also occur during unplanned outages caused by unexpected factors such as, for example, communication and system failures. Other factors that may cause network downtime condition will be apparent to one of ordinary skill in the art.

In another example aspect, determining if MFP 115 is in active connection or communication with network 120 may include determining whether MFP 115 is able to connect or communicate with the device needed to perform the network-based processing. For example, if the form templates are stored on remote computer 110, and the network-based processing is the downloading of updated forms to MFP 115, MFP 115 is in active communication with network 120 if MFP 115 is able to communicate with remote computer 110 and receive the updated forms.

A means to detect a network downtime condition may be incorporated in MFP 115 such as, for example, an attempt to contact remote computer 110. The attempt to contact remote computer 110 may return a positive or negative feedback. In some example embodiments, positive feedback may indicate a successful communication link between MFP 115 and remote computer 110 and vice-versa while negative feedback may indicate an unsuccessful or failed communication between MFP 115 and remote computer 110. Signals indicating a positive or a negative feedback may be provided by MFP 115 accordingly.

At block 210, if MFP 115 is determined to be in an inactive connection to network 120 indicating a network downtime condition or failure to communicate with remote computer 110, a means for establishing ad-hoc network connection may be activated in MFP 115 to connect MFP 115 to another device such as, for example, client device 105. Ad-hoc network connection may refer to a feature of the IEEE 802.11 standard. The ad hoc communications mode allows the radio network interface card (NIC) of MFP 115 to operate in what the IEEE 802.11 standard refers to as an independent basic service set (IBSS) network configuration. In an IBSS configuration, devices may communicate directly with each other without an intermediary, e.g., without an access point device. MFP 115 may include a wireless radio to allow for proximity ad-hoc connections. In some example embodiments, other means for establishing a connection between MFP 115 and client device 105 may be performed by using proximity-based protocols such as, for example, wireless USB and NFC. In yet other example embodiments, other means for connecting MFP 115 to client device 105 may be used, as will be known in the art.

At block 215, after MFP 115 and client device 105 have successfully established a connection or communications link, client device 105 may query MFP 115 for a document stored in MFP 115. For example, client device 105 may query MFP 115 for a template or a blank form that may be filled in or completed with information or data using client device 105. Example information for a healthcare template or form may include, for example, a patient's personal data (e.g., name, address, marital status, etc.), the date, the time, diagnosis, etc. It will be appreciated by those skilled in the art that other information or data may be used to complete templates or forms used in other industries.

At block 220, MFP 115 may send the document or template queried by client device 105 to client device 105. Sending the document may include sending the queried document from MFP 115 to client device 105 through the ad hoc network connection established at block 210. In some example embodiments, other means for sending the document from MFP 115 to client device 105 may be used, as is known in the art.

At block 225, the document or template may be processed by client device 105. In one example embodiment, processing the document may include populating the form with relevant information received from a user. For example, the user of client device 105 may process a form received from MFP 115 by populating or inputting data into the fields in the form with information that is relevant to the form such as, for example, a patient's personal information.

In another example embodiment, processing the document may include capturing a barcode and retrieving information from the barcode to populate the document. Capturing the barcode may include taking an image of the barcode using a camera, a barcode scanner or any image-capturing and/or information-retrieving component included in client device 105. For example, in a healthcare scenario, a healthcare worker may download a form from MFP 115 to client device 115; select a specific process or workflow by launching an information-retrieving application, such as a barcode scanning application; and capture a patient's barcode (e.g., from a wristband or a chart). An application in client device 115 may automatically fill in or complete the proper fields on the form using the retrieved information from the barcode. When information is retrieved from a barcode, the need for manual user input may be eliminated, or at least reduced.

Upon retrieving information from the barcode, fields in the document may be automatically completed or filled in with the retrieved information. Filling in the fields in the document may include utilizing forms logic to fill in the correct fields with the retrieved barcode information (e.g., filling in the patient name in the field corresponding to the patient name, filling in the patient number in the field corresponding to the patient number, etc.). In some example aspects, filling in the fields may also involve process steps such as, for example, recording a measurement such as patient temperature and/or marking the process as completed along with recording a timestamp. In other example aspects, steps may also include filling in contextual information such as time, date, location, and/or identification of the clinician performing the process steps, etc.

At block 230, client device 105 may send or transmit the processed document to MFP 115, and MFP 115 may store the processed document in its memory. In one aspect, storing the processed document may include adding the document to a queue of one or more processed documents to be automatically sent to remote computer 110 for storage once MFP 115 is determined to be in active communication with network 120 and remote computer 110. For example, the electronic form completed in client device 105 may be sent to MFP 115 for submission into remote computer 110. In another aspect, MFP 115 may check for an uptime condition of network 120 and/or active connection with remote computer 110 while storing the processed document in its memory, and when MFP 115 is determined to be in active connection with remote computer 110, MFP 115 may submit the completed electronic form to remote computer 110 for storage.

In another aspect, storing the processed document may include adding the document to a queue of one or more processed documents to be sent to a centralized document management system or central storage repository for storage once MFP 115 is determined to be in active communication with network 120. For example, the electronic form completed in client device 105 may be sent to MFP 115 for submission into the centralized document management system for storage once communication with network 120 is re-established.

In some example alternative embodiments, MFP 115 may store the processed document in its memory until an active communication with network 120 is detected, and the remote computer 110 or central storage repository requests transmission of the processed documents for storing.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 1 need to be performed in accordance with the embodiments of the disclosure and/or additional actions may be performed in accordance with other embodiments of the disclosure.

Many modifications and other example embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of enabling a peripheral device connected to a network, comprising:
   determining if the peripheral device is able to connect to a remote computer through the network;
   if the peripheral device unable to connect to the remote computer through the network, activating a direct connection between the peripheral device and a mobile device;
   transmitting a document to the mobile device for processing;
   receiving, by the peripheral device, a processed document from the mobile device;
   storing the processed document in a memory of the peripheral device; and
   sending the processed document to a remote storage location if the peripheral device is determined to be able to send the processed document to the remote storage location through the network.

2. The method of claim 1, wherein the peripheral device receives a request for the processed document prior to the sending.

3. The method of claim 1, wherein the peripheral device automatically performs the sending the processed document to the remote storage location once the peripheral device is determined to be actively communicating with the network.

4. The method of claim 1, further comprising receiving an updated copy of the document from the remote storage server.

5. The method of claim 1, wherein the processing includes capturing barcode information.

6. The method of claim 1, wherein the storing the processed document includes adding the processed document to a queue of one or more documents stored in the memory.

7. The method of claim 6, further comprising sending the one or more documents in the queue to the remote storage server once the peripheral device is determined to be actively communicating with the network.

8. A computing device with a non-transitory computer-readable storage medium containing computer executable instructions to:
   determine if the computing device is able to connect to a document processing device through a network;
   if the computing device is unable to connect to the processing device, initiate an ad-hoc network connection between a client device and the computing device;
   send a document to the client device for processing;
   receive a processed document from the client device;
   store the processed document in a memory of the computing device until the computing device is determined to be able to send the processed document to a remote storage location through the network; and
   send the stored processed document to the remote storage location once the computing device is determined to be able to send the processed document to the remote storage location through the network.

9. The computing device of claim 8, wherein the initiating the ad-hoc network connection includes connecting to the client device using a wireless radio in the computing device.

10. The computing device of claim 8, wherein the initiating the ad-hoc network connection includes connecting to the client device using one or more proximity-based protocols.

11. The computing device of claim 8, further comprising a computer executable instruction to receive an updated copy of the document from the remote storage location.

12. The computing device of claim 8, further comprising a computer executable instruction to periodically poll the remote storage location for an updated copy of the document.

13. A method of enabling processing of a form through a remote computer connected to a device through a network during downtime of the network, comprising:
   automatically determining if the network has returned to operation such that the device is able to send the form for processing to the remote computer;
   if the network has not returned to the operation, activating an ad-hoc network connection between the device and a mobile device;
   sending a form to the mobile device for field population;
   receiving a populated form from the mobile device;
   storing the populated form in a memory of the device until the network is determined to have returned to the operation; and sending the stored populated form to a remote storage location once the network is determined to have returned to the operation.

14. The method of claim 13, further comprising storing a copy of the form in the memory of the device.

15. The method of claim 13, further comprising receiving an updated master form from the remote storage location.

16. The method of claim 13, further comprising periodically polling a remote storage server to check for an updated form.

17. The method of claim 13, wherein the storing the populated form includes adding the populated form to a queue of one or more populated forms stored in the memory.

18. The method of claim 17, further comprising automatically sending the one or more populated forms in the queue to the remote storage location once the network is determined to return to the operation.

19. The method of claim 17, wherein the activating the ad-hoc network connection includes connecting to the mobile device using a wireless radio.

20. The method of claim 17, wherein the activating the ad-hoc network connection includes connecting to the mobile device using a proximity-based protocol.

* * * * *